(12) United States Patent
Bons et al.

(10) Patent No.: US 9,125,425 B2
(45) Date of Patent: Sep. 8, 2015

(54) EDIBLE FAT CONTINUOUS SPREADS

(75) Inventors: Johannes Robert Bons, AT Vlaardingen (NL); Eckhard Flöter, Berlin (DE); Hindrik Huizinga, AT Vlaardingen (NL); Irene Erica Smit-Kingma, AT Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/823,150

(22) PCT Filed: Sep. 1, 2011

(86) PCT No.: PCT/EP2011/065078
§ 371 (c)(1),
(2), (4) Date: Mar. 14, 2013

(87) PCT Pub. No.: WO2012/038226
PCT Pub. Date: Mar. 29, 2012

(65) Prior Publication Data
US 2013/0171310 A1    Jul. 4, 2013

(30) Foreign Application Priority Data

Sep. 22, 2010 (EP) .................................... 10178323

(51) Int. Cl.
| A23D 7/05 | (2006.01) |
| A23D 7/005 | (2006.01) |
| A23D 7/01 | (2006.01) |
| A23L 1/30 | (2006.01) |

(52) U.S. Cl.
CPC ............... *A23D 7/05* (2013.01); *A23D 7/0056* (2013.01); *A23D 7/013* (2013.01); *A23L 1/3004* (2013.01); *A23L 1/3006* (2013.01)

(58) Field of Classification Search
None
See application file for complete search history.

(56) References Cited

U.S. PATENT DOCUMENTS

| 4,115,598 A * | 9/1978 | Moran ........................ 426/604 |
| 4,143,172 A | 3/1979 | Mitchell et al. |
| 5,158,797 A * | 10/1992 | Studer et al. .................. 426/581 |
| 5,345,781 A | 9/1994 | Fels |
| 6,190,720 B1 | 2/2001 | Yuan et al. |
| 6,352,737 B1 | 3/2002 | Dolhaine |
| 6,423,359 B1 | 7/2002 | Braverman |
| 6,423,363 B1 | 7/2002 | Traska |
| 6,793,955 B1 * | 9/2004 | Landon ........................ 426/581 |
| 2001/0006672 A1 | 7/2001 | Akashe et al. |
| 2007/0054028 A1 * | 3/2007 | Perlman et al. ................ 426/601 |
| 2008/0268130 A1 * | 10/2008 | Bons et al. ..................... 426/604 |

FOREIGN PATENT DOCUMENTS

| EP | 0839458 | 5/1998 |
| EP | 1400176 A1 | 3/2004 |
| EP | 0990391 | 3/2009 |
| EP | 1382662 | 12/2009 |
| EP | 2196096 A1 | 6/2010 |
| WO | WO9813023 | 4/1998 |
| WO | WO9943218 | 9/1999 |
| WO | WO9956729 | 11/1999 |
| WO | WO0072697 A1 | 12/2000 |
| WO | WO0132029 | 9/2001 |
| WO | WO02100412 | 12/2002 |
| WO | WO03043433 A1 | 5/2003 |
| WO | WO2007030570A2 A2 | 3/2007 |
| WO | WO2008125380 A1 | 10/2008 |

OTHER PUBLICATIONS

Gunstone, F. 1983. Lipids in Foods, Chemistry, Biochemistry and Technology. Pergamon Press, New York. p. 154.*
Potter, N. 1973. Food Science, $2^{nd}$ edition. AVI Publishing Co., Inc., Westport, CT, p. 454-455.*
Christiansen et al., "Cholesterol-lowering effect of spreads enriched with microcrystalline plant sterols in hypercholesterolemic subjects", European Journal of Nutrition, 2001, vol. 40, pp. 66-73.
Hayes et al., "Nonesterified Phytosterols Dissolved and Recrystallized in Oil Reduce Plasma Cholesterol in Gerbils and Humans", The Journal of Nutrition, Jun. 2006, vol. 134, No. 6, pp. 1395-1399 (XP-002608540).
Kochhar, "Influence of Processing on Sterols of Edible Vegetable Oils", Prog. Lipid Res., 1983, vol. 22, pp. 161-188.
von Bonsdorff-Nikander et al., "Optimizing the Crystal Size and Habit of β-Sitosterol in Suspension", AAPS PharmSciTech, 2003, vol. 4 No. 3, pp. 1-8 (XP-002547714).
von Bonsdorff-Nikander, "Studies on a Cholesterol-Lowering Microcrystalline Phytosterol Suspension in Oil", Academic dissertation, Division of Pharmaceutical Technology, 2005, pp. 1-62.
PCT International Search Report in PCt application PCT/EP2011/065078 dated Sep. 30, 2011 with Written Opinion.
Elvers et al, Margarines and shortenings, Ullmanns Encyclopedia of Industrial Chemistry, 1990, 156-158, 5th Edition, vol. A16.
IPRP in PCTEP2011065078, Apr. 5, 2012, WO.
Written Opinion in PCTEP2011065078, Sep. 3, 2011, WO.
Microcrystalline, Wikipedia, 2012, pp. 1-2.
Naked Eye, Wikipedia, 2012, pp. 1-5.
Bonsdorff-Nikander et al., Physical Stability of a Microcrystalline B-sitosterol suspension in Oil, European Journal of Pharmaceutical Sciences, 2003, pp. 173-179, 19.

(Continued)

*Primary Examiner* — Carolyn Paden
(74) *Attorney, Agent, or Firm* — Gerard J. McGowan, Jr.

(57) ABSTRACT

The invention relates to a method of preparing an edible fat continuous spread comprising a dispersed aqueous phase and crystalline non-esterified plant sterol, said method comprising the steps of preparing a fat continuous emulsion and mixing said emulsion with fast re-crystallized non-esterified plant sterol.

20 Claims, No Drawings

(56) References Cited

OTHER PUBLICATIONS

Christiansen et al, A Novel Method of Producing a Microcrystalline B-sitosterol Suspension in Oil, European Journal of Pharmaceutical Sciences, 2002, pp. 261-269, 15.

Harlklia Vaikousi, Phase Transitions, Solubility, and Crystallization Kinetics of Phytosterols and Phytosterol-Oil Blends, Journal of Agricultural and Food Chemistry, 2007, pp. 1790-1798, 55.

K. C. Hayes, Nonesterified Phytosterols Dissolved and Recrystallized in Oil Reduce Plasma Cholesterol in Gerbils and Humans, Human Nutrition and Metabolism, 2004, pp. 1395-1399.

R. Engel, Formulation of phytosterols in emulsions for increased dose response in functional foods, Innovative Food Science & Emerging Technologies, 2005, pp. 233-237, 6.

* cited by examiner

EDIBLE FAT CONTINUOUS SPREADS

FIELD OF THE INVENTION

The invention relates to a method of preparing edible fat continuous spreads comprising crystalline non-esterified plant sterol.

BACKGROUND OF THE INVENTION

Edible fat continuous spreads like e.g. margarine and low fat spreads are well known food products that comprise a continuous fat phase and a dispersed aqueous phase. The fat phase comprises liquid oil and structuring fat (also known as hard stock). The liquid oil is liquid at room temperature. The structuring fat is solid at room temperature and serves to structure the fat phase and helps to stabilize the emulsion.

The liquid oil fraction typically comprises liquid unmodified vegetable oil such as soybean oil, sunflower oil, low erucic rapeseed oil (Canola), corn oil and blends of vegetable oils.

For an edible fat continuous spread, ideally the structuring fat has such properties that it melts or dissolves at mouth temperature. Otherwise the product may have a heavy and/or waxy mouthfeel. Furthermore, the overall organoleptic impression should be smooth and preferable no perceivable grains should be present upon ingestion as this may result in what is generally known as a 'sandy mouthfeel'.

Other important aspects of an edible fat continuous spread are for example hardness, spreadability, storage stability and ability to withstand temperature cycling. Temperature cycling means that the product is subjected to low and high temperatures (e.g. when the consumer takes the product out of the refrigerator and leaves it for some time at the table prior to use). This may have a negative influence on the structure of the spread (like for example destabilization of the emulsion, oil-exudation or crystal growth).

Plant sterols are well known cholesterol lowering agents. The benefit of these ingredients to reduce the risk to cardiovascular diseases has been established for years. Where these active ingredients were initially available in the form of capsules and other pharmaceutical preparations only, over the years they have also become available in food products. The incorporation of these active ingredients in food products that are consumed daily enables the easy and reliable intake of these ingredients for many people.

Plant sterols can be classified in three groups, 4-desmethylsterols, 4-monomethylsterols and 4,4'-dimethylsterols. In oils they mainly exist as free sterols and sterol esters of fatty acids although sterol glucosides and acylated sterol glucosides are also present. There are three major phytosterols namely beta-sitosterol, stigmasterol and campesterol. Schematic drawings of the components meant are as given in "Influence of Processing on Sterols of Edible Vegetable Oils", S. P. Kochhar; *Prog. Lipid Res.* 22: pp. 161-188.

The respective 5 alpha-saturated derivatives such as sitostanol, campestanol and ergostanol and their derivatives are also encompassed in the term plant sterol.

Plant sterols as such are difficult to formulate into food products due to their poor solubility in oil and immiscibility in water which may result in food products having poor organoleptic properties, e.g. a sandy mouth feel. This made the choice of food products suitable for incorporation of plant sterols very limited. To overcome this drawback plant sterols have been modified to improve their solubility in the fat phase of food products. The most common modification of plant sterols is to their corresponding fatty acid esters. Commercial products such as Becel Pro-activ™, and Benecol™ comprise sterol fatty acid esters.

The esterification of plant sterol with fatty acids requires inter alia additional processing steps and results in additional costs.

WO 03/043433 A1 describes prepared foods, such a fried snack foods, fortified with non-esterified phytosterols delivered in fats or oils that are essentially free of emulsifiers, and the utility of such phytosterols for stabilizing heated fats and oils against oxidation. The phytosterols have been recrystallized in vegetable oil by cooling by ambient air and results in macro-crystalline structures spanning tens or hundreds of microns. It is stated that the material when tasted has a surprisingly soft and agreeable mouth feel.

WO 2007/030570 relates to food compositions comprising a fat based composition comprising 25 to 75 wt % of triglycerides and 25 to 75 wt % of triglyceride recrystallized phytosterols. The food product may be a spread. The phytosterols have been recrystallized in vegetable oil by cooling by ambient air and results in macro-crystalline structures spanning tens or hundreds of microns.

WO 98/13023 discloses a product containing plant sterol, sweetening agent and water, without admixtures. Example 8 discloses the preparation of a water continuous spread.

WO 2008/125380 describes fat continuous spreads comprising plant sterol in the form of elongated crystals produced by re-crystallisation from oil. However, the presence of such relatively large crystals is believed to be less suitable because it creates a grainy or sandy mouthfeel, especially upon storage. Furthermore, a slow crystallisation process is required reducing the efficiency of the production process.

From a nutritional point of view it is desirable to keep the SAFA level as low as possible as (high levels of consumption of) SAFA increases the risk of Coronary Heart Disease. Furthermore, as fat tends to have a greater energy density (energy per gram) than carbohydrates and proteins it may also be desirable to keep the overall fat level of a food product as low as possible. It is not always possible to lower the amount of SAFA and/or overall fat level in an edible fat continuous spread as this may influence the ease of processing, the organoleptic properties and/or the ease of incorporation of health actives like e.g. plant sterol.

It is an object of the present invention to provide an edible fat continuous spread suitable for lowering cholesterol. It is also an object of the invention to provide an edible fat continuous spread suitable for lowering cholesterol that is simple to make and/or requires less process steps. It is a further object of the invention to provide an edible fat continuous spread suitable for lowering cholesterol with an improved and/or storage stable structure and/or organoleptic properties.

SUMMARY OF THE INVENTION

One or more of the above mentioned objects is attained by a method of preparing an edible fat continuous spread comprising a dispersed aqueous phase and crystalline non-esterified plant sterol, said method comprising the steps of preparing a fat continuous emulsion and mixing said emulsion with fast re-crystallized non-esterified plant sterol.

We have found that the combination of fast re-crystallization of non-esterified plant sterol and addition of said re-crystallized non-esterified plant sterol to a preformed fat continuous emulsion comprising an aqueous phase provides a spread with good organoleptic properties and/or requires less chemical modification such as esterification or additives such as large amounts of emulsifiers and/or are storage stable in that plant sterol crystal growth is reduced.

DETAILED DESCRIPTION OF THE INVENTION

Accordingly the invention relates to a method of preparing an edible fat continuous spread comprising a dispersed aqueous phase, 20 to 80 wt % fat and 0.1 to 20 wt % crystalline non-esterified plant sterol, said method comprising the steps of a. providing an aqueous phase (A);
b. providing a fat phase (B);
c. preparing a fat continuous emulsion (C) comprising the step of mixing aqueous phase (A) and fat phase (B);
d. providing a fat slurry (D) comprising crystalline non-esterified plant sterol and vegetable oil;
e. mixing fat slurry (D) with fat continuous emulsion (C);
  wherein fat slurry (D) comprises re-crystallized non-esterified plant sterol prepared by re-crystallizing the non-esterified plant sterol from a mixture comprising vegetable oil and heat dissolved non-esterified plant sterol by cooling said mixture at a cooling rate of at least 2.5 degrees Celsius per second and wherein the average particle size of the resulting crystalline non-esterified plant sterol is smaller than 20 micron.

Wt % is calculated on weight of total product unless otherwise specified. The terms 'oil' and 'fat' are used interchangeably unless specified otherwise. The terms 'plant sterol' and 'phytosterol' are used interchangeably unless specified otherwise.

Plant Sterols

Preferably the plant sterol is selected from the group comprising β-sitosterol, β-sitostanol, campesterol, campestanol, stigmasterol, brassicasterol, brassicastanol or a mixture thereof. Suitable sources of plant sterols are for example derived from soy bean oil or tall oil.

In the context of this invention the term plant sterol refers to the free plant sterol, i.e. the non-esterified plant sterol, unless specified otherwise.

Re-Crystallizing the Non-Esterified Plant Sterol

The crystalline non-esterified plant sterol is prepared by re-crystallizing the non-esterified plant sterol from a mixture comprising vegetable oil and heat dissolved non-esterified plant sterol. The non-esterified plant sterol can be suitably heat dissolved by common methods like e.g. heating the vegetable oil and plant sterol until part or all plant sterol is dissolved or heating the vegetable oil and subsequently adding the plant sterol. This is followed by re-crystallization of the plant sterol from the mixture by cooling said mixture.

The re-crystallization of the plant sterol from the mixture comprising vegetable oil and heat dissolved plant sterol should be done by rapid cooling of the heated solution, e.g. crash cooling, and should be done at a cooling rate of at least 2.5 degrees Celsius per second. As rapid cooling is desired it will be appreciated that the upper limit is merely restricted by the technical means of the equipment used. Slower cooling rates should be avoided as this may result in bigger crystals that may be more noticeable when consumed and/or show crystal growth in the edible fat continuous spread upon storage. The cooling rate is measured on the mixture comprising vegetable oil and heat dissolved plant sterol. To prevent bigger crystals from forming it is preferred to make sure that the complete mixture is subjected to the required cooling rate (and not e.g. only the parts in close contact with the cooling aid). It will be appreciated that this can easily be achieved by providing adequate cooling capacity in relation to the amount of vegetable oil and heat dissolved plant sterol.

Preferably the cooling rate is at least 3, more preferably at least 4, even more preferably 4 to 15 and still even more preferably 5 to 10 degrees Celsius per second. Preferably the resulting mixture has a temperature of less than 60, preferably of 20 to 60, more preferably of 20 to 45 and even more preferably of 25 to 35 degrees Celsius.

Suitable cooling methods include the use of heat exchangers like e.g. a tubular heat exchanger, a surface scraped heat exchanger such as an A-unit, with either plastic or metal knifes, or the use of a coolant like e.g. cold gas or cryogenic cooling medium.

Preferably the mixture comprising vegetable oil and heat dissolved plant sterol is prepared by heating the triglycerides and plant sterol until all plant sterol is dissolved. Preferably, said mixture is heated to a temperature of 100 to 150, more preferably 105 to 140, even more preferably 110 to 135 and still even more preferably 115 to 130 degrees Celsius.

Suitable vegetable oils include single vegetable oils (i.e. from a single source) and blends thereof. Preferably the vegetable oil is selected from the group consisting of soybean oil, sunflower oil, low erucic rapeseed oil (Canola), corn oil and mixtures thereof. Especially preferred are sunflower oil and vegetable oil mixtures comprising sunflower oil.

The edible fat continuous spread comprises 0.1 to 20 wt % crystalline non-esterified plant sterol, preferably 2 to 15, more preferably 4 to 10 and even more preferably 6 to 8 wt %.

Re-Crystallized Non-Esterified Plant Sterol

After the re-crystallization of the plant sterol, the mixture comprising the vegetable oil and re-crystallized plant sterol may be used as such. However, it may be preferred to dilute this mixture further with for example more vegetable oil to get a mixture with the required concentration of plant sterol. Preferably this mixture does not contain structuring fat, i.e. all fat used in this mixture is liquid at room temperature.

The temperature of the mixture comprising the vegetable oil and re-crystallized plant sterol should preferably be kept at a temperature below 60 degrees Celsius once the plant sterols are re-crystallized, e.g. the mixture comprising vegetable oil and re-crystallized plant sterol should not be heated to temperatures above 60 degrees Celsius. This is to prevent the plant sterol crystals from dissolving again and re-crystallizing uncontrolled, thereby forming unwanted plant sterol structures. On the other hand the temperature of the mixture comprising the vegetable oil and re-crystallized plant sterol preferably is at least 20 degrees Celsius to allow good processing. Hence, the temperature of the mixture comprising the vegetable oil and re-crystallized plant sterol is preferably kept at a temperature between 20 and 60 degrees Celsius, more preferably 20 and 45 degrees Celsius and even more preferably between 25 and 35 degrees Celsius.

The average particle size of the re-crystallized non-esterified plant sterol should be smaller than 20 micron. This will follow from the fast cooling rates as applied in this invention. The average particle size is determined by using light microscopy with polarized light according to the protocol as explained in the experimental section. Preferably the average particle size of the re-crystallized non-esterified plant sterol is smaller than 15, more preferably smaller than 10, even more preferably from 5 to 15, even still more preferably from 7 to 12 and even further more preferably from 8 to 10 micron. The re-crystallization of the plant sterol from the mixture comprising vegetable oil and heat dissolved plant sterol allows for plant sterol particles with exceptional organoleptic properties in an edible fat continuous spread when used according the method according to this invention. This may not be achievable by other more common methods like e.g. grinding of powders.

Fat Slurry Comprising Crystalline Non-Esterified Plant Sterol and Vegetable Oil

The mixture comprising the re-crystallized non-esterified plant sterol and vegetable oil is used to form a fat slurry (D). Preferably said fat slurry comprises non-esterified plant sterol and vegetable oil in a weight ratio of 1:1 to 1:10, more preferably 1:1.5 to 1:6 and even more preferably 1:2 to 1:4. The weight ratio concerns the weight ratio of non-esterified plant sterol:vegetable oil (e.g. a weight ratio of 1:10 means 1 part by weight of non-esterified plant sterol and 10 parts by weight of vegetable oil).

Further ingredients common in spreads making may be added to the fat slurry like e.g. fat soluble vitamins, or e.g. other (health) actives. Preferably minor amounts of additional ingredients are used and more preferably the fat slurry consists essentially of re-crystallized non-esterified plant sterol and vegetable oil.

When using the crystalline non-esterified plant sterol of the present invention there is no need for emulsifiers to emulsify the non-esterified plant sterols to achieve acceptable organoleptic properties. Therefore, the amount of emulsifiers may be limited.

Preferably the amount of emulsifier in fat slurry (D) is less than 1 wt % (calculated on total amount of fat slurry), more preferably less than 0.5 wt % and even more preferably less than 0.3 wt %. Most preferably fat slurry (D) is essentially free of added emulsifiers. It should be noted that minor amounts of fat soluble emulsifier, predominantly monoglyceride, are naturally present in edible oils and fats. For most edible (that is refined) oils and fats the amounts present are below 0.05 wt % or even lower. A known exception is refined palm oil that may contain up to about 0.5 wt % of fat soluble emulsifier that is naturally present.

Preferably the amount of emulsifier in the edible fat continuous spread is less than 1.5 wt % (calculated on total amount of spread), more preferably less than 1 wt % and even more preferably less than 0.5 wt %.

Fat Continuous Emulsion

Fat slurry (D) is mixed with a fat continuous emulsion (C) to obtain the edible fat continuous spread according to the invention. The fat continuous emulsion (C) can be suitably prepared by common known methods in the art of preparing fat continuous emulsions. This will comprise the step of mixing an aqueous phase (A) and a fat phase (B).

For example, a fat continuous emulsion may be prepared by providing an aqueous phase comprising water and e.g. salt and preservatives or other ingredients commonly used in the art of spreads making like for example dairy protein, providing a fat phase comprising liquid oil and structuring fat and e.g. further ingredients commonly used in the art of spreads making like for example fat soluble flavors, mixing of the aqueous phase and the fat phase at elevated temperatures at which the fat is fully liquid, and subjecting the resulting emulsion to one or more cooling and or working treatments.

One or more of the steps of a typical process for making an emulsion is usually conducted in a process that involves apparatus that allow heating, cooling and mechanical working of the ingredients, such as the churn process or the votator process. The churn process and the votator process are described in Ullmanns Encyclopedia, Fifth Edition, Volume A 16 pages 156-158.

The fat phase (B) will typically comprise liquid oil and structuring fat (hardstock). The structuring fat structures the fat phase and helps to stabilise the emulsion. The crystallization and melting properties of the structuring fat are important as they influence the stability of the emulsion, e.g. syneresis and plasticity, as well as the organoleptic properties, e.g. oral melting behaviour and flavour release.

It will be appreciated that the amount of structuring fat necessary for imparting structure to an emulsion depends on the total amount of fat phase, the kind of liquid fat, the structuring fat used and the desired structure. For a stable spread a certain amount of structuring fat is necessary. If the amount of structuring fat is too low, a stable emulsion may not be obtained and the resulting emulsion may not comprise the typical plasticity of a spread.

The oil or fat may be any suitable oil or fat. Preferred oil and fat are those known for the production of margarine and margarine derivatives such as low fat spreads. The oil or fat is for example selected from the group comprising sunflower oil, rapeseed oil, palm oil, coconut oil, soy bean oil, palm kernel oil, butter fat or a combination thereof. Preferably at least 80 wt % of fat phase (B) (based on total fat phase) is of vegetable origin, more preferably at least 90 wt % and still more preferably at least 95 wt %. Most preferably fat phase (B) essentially consists of oil and fat of vegetable origin.

The oil in fat phase (B) is liquid oil and may be a single oil or a mixture of different oils, and may comprise other components. Preferably at least 50 wt % of the oil (based on total amount of oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

Preferably fat slurry (D) and fat continuous emulsion (C) are mixed in a weight ratio (fat slurry (D):fat continuous emulsion (C)) of 1:10 to 4:1, more preferably 1:8 to 3:1, even more preferably 1:5 to 2:1 and still even more preferably 1:4 to 1:1.

The edible fat continuous spread comprises 20 to 80 wt % fat, preferably 25 to 60 and preferably 30 to 50 wt %.

The edible continuous spread preferably comprises 15 to 75, more preferably 20 to 70 and even more preferably 30 to 60 wt % water.

Preferably the edible fat continuous spread comprises less than 1 wt % of sweetener, more preferably less than 0.5, even more preferably less than 0.1 and still even more preferably is free of added sweetener.

The invention is now illustrated by the following non-limiting examples.

EXAMPLES

Particle Size Analysis

The average particle size of crystalline non-esterified plant sterol particles was determined by analyzing images obtained using light microscopy with polarized light according to the following protocol.

The length of the light elongated features in the images was measured (the crystalline particles are visible as light features on a black/grey background).

A ruler was used to measure the length of the features and the physical width of the image. The measured physical length of each feature was divided by the image width (in mm or inches) and multiplied by the true image width in micron. Particles touching the image border have to be rejected. At least 10 particles have to be measured for each image. Particles have to be selected at random.

Making of Spreads

Edible fat continuous spreads were made by first making a fat continuous emulsion from an aqueous phase and a fat phase using conventional votator processing (AAC configuration) using the composition as in Table 1.

A fat slurry comprising crystalline non-esterified plant sterol and sunflower oil was made by heat-dissolving non-esterified plant sterol in sunflower oil followed by cooling the mixture using a surface scraped heat exchanger (A-unit). Details can be found in Tables 2 and 3.

The final spread was made by mixing an amount of fat continuous emulsion and fat slurry comprising crystalline non-esterified plant sterol as in Table 4 using a static mixer.

The following spreads were so obtained: examples 1 to 4 according to the invention and comparative examples A and B. The spreads were stored at 5 degrees Celsius.

The plant sterols of examples 1 to 4 could not be tasted when tasting the spread (i.e. let the spread melt in the mouth). The plant sterol of comparative examples A and B gave a sandy mouth feel when tasted.

Examples 1 to 4 and comparative examples A and B were subjected to a temperature of 30 degrees Celsius for a period of 48 hours. No crystal growth of the plant sterol particles could be observed in examples 1 to 4.

TABLE 1

Fat continuous emulsion (parts, w/w)

| | 1 | 2 | 3 | 4 | A | B |
|---|---|---|---|---|---|---|
| FAT PHASE | | | | | | |
| Fat blend # | 29.5 | 29.5 | 32.5 | 32.5 | 32.5 | 29.5 |
| Mono-glyceride | 0.35 | 0.35 | 0.35 | 0.35 | 0.35 | 0.35 |
| Lecithin | 0.05 | 0.05 | 0.05 | 0.05 | 0.05 | 0.05 |
| Poly glycerol poly ricinoleate | 0.1 | 0.1 | 0.1 | 0.1 | 0.1 | 0.1 |
| Flavor/colorant | trace | trace | trace | trace | trace | trace |
| Total | 30 | 30 | 33 | 33 | 33 | 30 |
| AQUEOUS PHASE | | | | | | |
| Water | balance | balance | balance | balance | balance | balance |
| Starch | 4 | 4 | 4 | 4 | 3.5 | 4 |
| Gelatine | 2 | 2 | 2 | 2 | — | 2 |
| Potassium sorbate | 0.13 | 0.13 | 0.13 | 0.13 | 0.13 | 0.13 |
| Salt (NaCl) | 0.6 | 0.6 | 0.6 | 0.6 | 1.2 | 0.6 |
| Total | 70 | 70 | 67 | 67 | 67 | 70 |
| TOTAL | 100 | 100 | 100 | 100 | 100 | 100 |

Fat blend consisted of 86 wt % sunflower oil, 10 wt % of an interesterified mixture of 65% dry fractionated palm oil stearin with an Iodine Value of 14 and 35% palm kernel oil, and 4 wt % of an interesterified mixture of 60% palm stearin and 40% shea stearin.

TABLE 2

Fat slurry composition (parts, w/w)

| FAT SLURRY | 1 | 2 | 3 | 4 | A | B |
|---|---|---|---|---|---|---|
| Sunflower oil | 70 | 60 | 65 | 65 | 65 | 70 |
| Plant sterol # | 30 | 40 | 35 | 35 | 35 | 30 |
| TOTAL | 100 | 100 | 100 | 100 | 100 | 100 |

Plant sterol obtained from tall oil.

TABLE 3

Cooling rate and plant sterol particle size of fat slurry

| | 1 | 2 | 3 | 4 | A | B |
|---|---|---|---|---|---|---|
| Start temperature (°Celsius) | 120 | 125 | 130 | 115 | 115 | 120 |
| Cooling rate (°Celsius/second) | 9.2 | 6.9 | 3.9 | 8.3 | 0.031 | 0.073 |
| End temperature (°Celsius) | 34 | 33 | 38 | 22 | 26 | 17 |
| Plant sterol particle size (micron) | 10 | 10 | 15 | 12 | 100 | 60 |

TABLE 4

Spread composition (parts, w/w)

| | 1 | 2 | 3 | 4 | A | B |
|---|---|---|---|---|---|---|
| Pre-emulsion | 75 | 81 | 78 | 78 | 80 | 75 |
| Fat slurry | 25 | 19 | 22 | 22 | 20 | 25 |
| TOTAL | 100 | 100 | 100 | 100 | 100 | 100 |

The invention claimed is:

1. Method of preparing an edible fat continuous spread comprising a dispersed aqueous phase, 20 to 80 wt % fat and 0.1 to 20 wt % crystalline non-esterified plant sterol, said method comprising the steps of
   a. providing an aqueous phase (A);
   b. providing a fat phase (B);
   c. preparing a fat continuous emulsion (C) comprising the step of mixing aqueous phase (A) and fat phase (B);
   d. providing a fat slurry (D) comprising crystalline non-esterified plant sterol and vegetable oil;
   e. mixing fat slurry (D) with fat continuous emulsion (C);
   wherein fat slurry (D) comprises re-crystallized non-esterified plant sterol prepared by re-crystallizing the non-esterified plant sterol from a mixture comprising vegetable oil and heat dissolved non-esterified plant sterol by cooling said mixture at a cooling rate of at least 2.5 degrees Celsius per second and wherein the average particle size of the resulting crystalline non-esterified plant sterol is smaller than 20 micron.

2. Method according to claim 1 wherein the re-crystallized non-esterified plant sterol is prepared by re-crystallizing the non-esterified plant sterol from a mixture comprising vegetable oil and heat dissolved non-esterified plant sterol by cooling said mixture at a cooling rate of at least 3, degrees Celsius per second.

3. The method according to claim 2 wherein the cooling rate is 4 to 15 degrees Celsius per second.

4. The method according to claim 2 wherein the cooling rate is 5 to 10 degrees Celsius per second.

5. Method according to claim 1 wherein the re-crystallized non-esterified plant sterol is prepared by re-crystallizing the non-esterified plant sterol from a mixture comprising vegetable oil and heat dissolved non-esterified plant sterol by cooling said mixture, said mixture having a temperature of 100 to 150 degrees Celsius.

6. The method according to claim 5 wherein the temperature of the mixture is from 110 to 135 degrees Celsius.

7. Method according to claim 1 wherein the re-crystallized non-esterified plant sterol is prepared by re-crystallizing the non-esterified plant sterol from a mixture comprising vegetable oil and heat dissolved non-esterified plant sterol by cooling said mixture and the resulting mixture has a temperature of less than 60 degrees Celsius.

8. The method according to claim 7 wherein the temperature of the resulting mixture is from 20 to 60 degrees Celsius.

9. Method according to claim 1 wherein fat slurry (D) comprises non-esterified plant sterol and vegetable oil in a weight ratio of 1:1 to 1:10.

10. The method according to claim 9 wherein the fat slurry (D) comprises non-esterified plant sterol and vegetable oil in a weight ratio of 1:1.5 to 1:6.

11. Method according to claim 1 wherein the average particle size of the resulting crystalline non-esterified plant sterol is smaller than 15 micron.

12. The method according to claim 11 wherein the average particle size of the resulting crystalline non-esterified plant sterol is from 5 to 15 micron.

13. Method according to claim 1 wherein fat slurry (D) and fat continuous emulsion (C) are mixed in a weight ratio of 1:10 to 4:1.

14. The method according to claim 13 wherein fat slurry (D) and fat continuous emulsion (C) are mixed in a weight ratio of 1:5 to 2:1.

15. Method according to claim 1 wherein the edible fat continuous spread comprises 25 to 60 wt % fat.

16. The method according to claim 15 wherein the edible fat continuous spread comprises 30 to 50 wt % fat.

17. Method according to claim 1 wherein the edible fat continuous spread comprises 15 to 75 wt % water.

18. Method according to claim 1 wherein the edible fat continuous spread comprises 2 to 15 wt % crystalline non-esterified plant sterol.

19. The method according to claim 18 wherein the edible fat continuous spread comprises 4 to 10 wt % crystalline non-esterified plant sterol.

20. Method according to claim 1 wherein the edible fat continuous spread comprises less than 1 wt % of sweetener.

* * * * *